Nov. 19, 1935.  A. ENGLAND  2,021,842
HOSE COUPLING GAUGE
Original Filed June 27, 1933
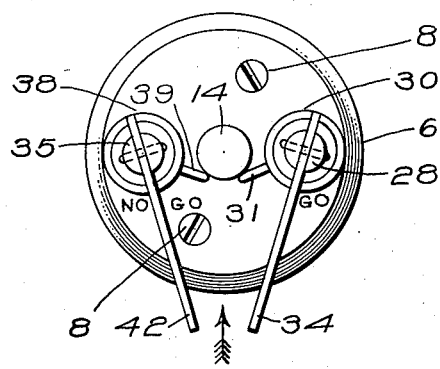
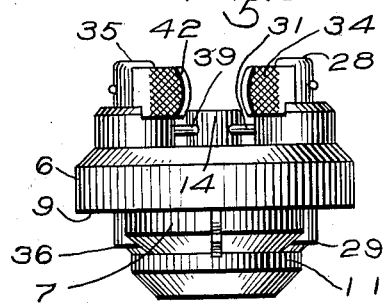
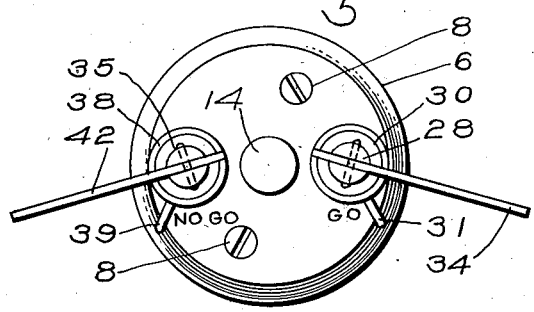
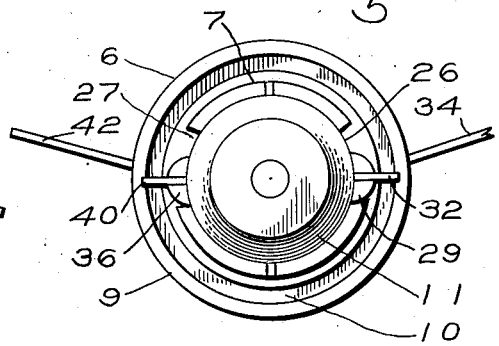
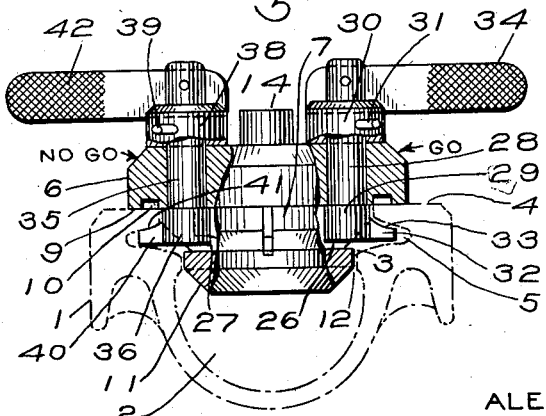
INVENTOR
ALEXANDER ENGLAND
BY *Wm. N. Cady*
ATTORNEY Patented Nov. 19, 1935

2,021,842

UNITED STATES PATENT OFFICE 2,021,842

HOSE COUPLING GAUGE

Alexander England, Wilkinsburg, Pa., assignor to The Westinghouse Air Brake Company, Wilmerding, Pa., a corporation of Pennsylvania Original application June 27, 1933, Serial No. 677,806. Divided and this application August 18, 1934, Serial No. 740,473

2 Claims. (Cl. 33—174)

This invention relates to test gauges and more particularly to a test gauge for hand operated hose couplings, and is a division of my pending application Serial No. 677,806, filed June 27, 1933.

The railway type of hand operated hose coupling is usually provided on one side with a flat, machined face and opening to said face is a bore provided to permit the flow of fluid under pressure. Opening into this bore a certain distance from the flat face of the coupling, is an annular, wedge-shaped groove. A gasket ring having a cylindrical portion extending into the bore in the coupling is provided with an outwardly projecting, annular, wedge-shaped flange disposed in the groove in the coupling for effecting a seal in the groove, the cylindrical portion of the gasket extending beyond the flat face of the coupling and being adapted to engage and effect a leakproof seal with the corresponding cylindrical portion of a counterpart gasket, when two couplings are connected.

In the coupling, it is essential that the width of the annular groove, where engaged by the flange of the gasket, be within predetermined limits, and that the distance from the flat, machined face of the coupling to the groove also be within predetermined limits in order to prevent leakage past the gasket and to permit the gasket to function as intended.

The principal object of my invention is to provide a test gauge for hose couplings to determine whether the location of the gasket groove with respect to the flat gasket face of the coupling is within predetermined limits.

In the accompanying drawing; Fig. 1 is a plan view of my improved hose coupling gauge; Fig. 2 is a side elevation looking in the direction of the arrow in Fig. 1; Fig. 3 is a plan view, similar to Fig. 1, but with the gauge operating handles disposed in a gauging position; Fig. 4 is a reverse plan view with the gauge operating handles disposed in a gauging position; and Fig. 5 is a side elevation similar to Fig. 2, but with certain parts broken away, and showing the gauge applied to a hose coupling.

Fig. 5 shows a transverse section of a hand operated hose coupling which is of the well known type adapted for use in connecting the brake pipe or other pipes between cars in a train. The hose coupling comprises a body 1 having a fluid pressure conduit 2 communicating with a bore 3 which leads to a flat machined face 4 on one side of the body.

A wedge-shaped groove 5, concentric with bore 3, is provided in the coupling a predetermined distance below the flat face 4, said groove being adapted to receive the wedge-shaped flange of the usual ring gasket (not shown), while the cylindrical portion of the gasket is adapted to extend through the bore 3 and slightly beyond the face 4 of the coupling for engaging a corresponding gasket in a counterpart coupling (not shown).

The hose coupling gauge comprises a ring-shaped body 6 and a concentric metal boss 7 secured to one side of the body by means of two screws 8. On the side of body 6 carrying the boss 7, the body is provided with a gauging surface 9 which is adapted to engage the flat face 4 of the coupling 1, as shown in Fig. 5, an annular groove 10 being provided in the gauging surface 9 to reduce the width of the gauging surface 9 and thereby better ensure proper contact between said surface and the face 4 of the coupling. The boss 7 is of such diameter adjacent body 6 as to provide a free sliding fit in bore 3 in the coupling and is provided with a portion 11 of reduced diameter which freely enters the opening 12 adjacent the inner edge of the gasket groove 5, the outer end of said boss being tapered to facilitate the application of the gauge to a coupling.

Two diametrically opposite cavities 26 and 27 are formed in the boss 7. A shaft 28, having an enlarged head portion 29 disposed in cavity 26, is mounted to rotate in a suitable bore in the body 6. A sleeve 30 is secured to said shaft by means of a pin 31, and is adapted to hold the head portion 29 of said shaft in engagement with the body. A gauge blade 32 is secured in the head portion 29 of the shaft and is normally carried within cavity 26, and is of such length that when turned to a radial position, said gauge blade will extend into the groove 5 of a hose coupling substantially the same distance as a gasket extends into said groove. The edge 33 of the gauge blade 32 is provided with a contour substantially the same as that of the outer wall of the gasket groove 5, and is arranged a predetermined distance from the surface 9 on the body 6, said edge constituting a "go" gauge for the distance from the face 4 on the body to said groove. The width of the blade 32 is less than the width of the groove 5 in the coupling so that the edge of said blade opposite the gauging edge 33 will not engage the coupling within the groove 5, when the gauge is being used as will be hereinafter described. A handle 34 is secured to the outer end of shaft 28 for turning the "go" gauge blade 32 from the position in cavity 26 to the gauging position shown in Figs. 4 and 5.

A shaft 35 is rotatably arranged in a suitable bore in body 6 diametrically opposite to shaft 28 and is provided with a head portion 36 in cavity 27, a sleeve 38 being secured to shaft 35 outside of the body 6 by means of a pin 39 for holding the head portion 36 in engagement with the body. A gauge blade 40 is carried by the head portion 36 and is normally disposed in cavity 27. The blade 40 is of the same length as the gauge blade 32 and is provided with a gauging edge 41 like that of blade 32, but the gauging edge 41, which constitutes a "nogo" gauge, is closer to the gauging surface 9 on the body 6 than is the gauging edge 33 on blade 32. The width of the "nogo" gauging blade 40 is less than that of groove 5 so that the lower edge of the blade will not engage the coupling within the groove when the gauge is being used, as will be hereinafter described. A handle 42 is secured to the outer end of shaft 35 for turning the "nogo" gauge blade 40 from the position in cavity 27 to the gauging position as shown in Figs. 4 and 5.

To use the gauge, the handles 34 and 42 are turned to the positions shown in Figs. 1 and 2 which positions may be defined by the engagement of pins 39 and 31 with a member 14 carried by the body 6, and in which the gauge blades 32 and 40 are within the cavities 26 and 27 of boss 7. The gauge is now applied to the hose coupling 1, the boss 7 entering the bore 3 in the coupling until the gauging surface 9 on the gauge body 6 engages the surface 4 on the coupling.

After the gauge is applied to the hose coupling 1, then in order to determine whether or not the gasket groove 5 is properly located with respect to the coupling face 4, the handle 34 of the "go" gauge is turned towards the gauging position indicated in Figs. 3, 4 and 5, and this operation of said handle turns the "go" gauge blade 32 into the coupling groove 5. If the edge 33 of the gauge blade 32 does not engage the upper wall of the gasket groove 5 it indicates that said groove is not too far away from the coupling face 4 to be satisfactory. Then handle 42 is turned towards the gauging position shown in Figs. 3, 4 and 5 and if the edge 41 of the "nogo" gauge blade 40 engages the upper wall of the gasket groove 5 it indicates that the groove 5 is not too close to the coupling face 4 to be satisfactory.

It will now be evident that by means of the gauge blades 32 and 40 the location of the gasket groove 5 in a hose coupling with respect to the coupling face 4 can be accurately and quickly checked to determine whether or not a gasket in said groove will be properly positioned to cooperate with the abutting gasket of a counterpart coupling in the proper manner to prevent leakage.

While but one illustrative embodiment of the invention has been described in detail, it is not my intention to limit its scope to that embodiment or otherwise than by the terms of the appended claims.

Having now described my invention, what I claim as new and desire to secure by Letters Patent, is:

1. A gauge for checking the distance from the coupling face of a hose coupling to the gasket groove opening into the bore leading to said coupling face, said gauge comprising a member adapted to engage the coupling face of the hose coupling, a boss on said member having a free sliding fit in said bore, and gauge means disposed wholly within said boss when said boss is inserted in said bore and movable out of said boss into said groove for checking said distance.

2. A gauge for checking the distance from the coupling face of a hose coupling to the gasket groove opening into the bore leading to said coupling face, said gauge comprising a member adapted to engage the coupling face of the hose coupling, a boss on said member adapted to fit into said bore, said boss having spaced cavities opening to the side thereof, a shaft carried by said member and extending into one of said cavities, a gauge blade carried by said shaft in said cavity and movable out of said cavity into said groove for checking the maximum distance of said groove from said coupling face, another shaft carried by said member and extending into another of said cavities, a gauge blade carried by the other shaft and movable out of said cavity into said groove for checking the minimum distance of said groove from said coupling face and a handle secured to each of said shafts, for turning said shafts.

ALEXANDER ENGLAND.